Figure 5:
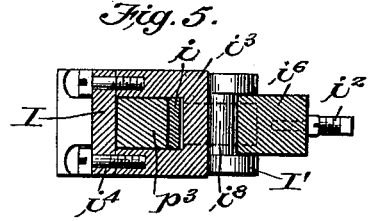

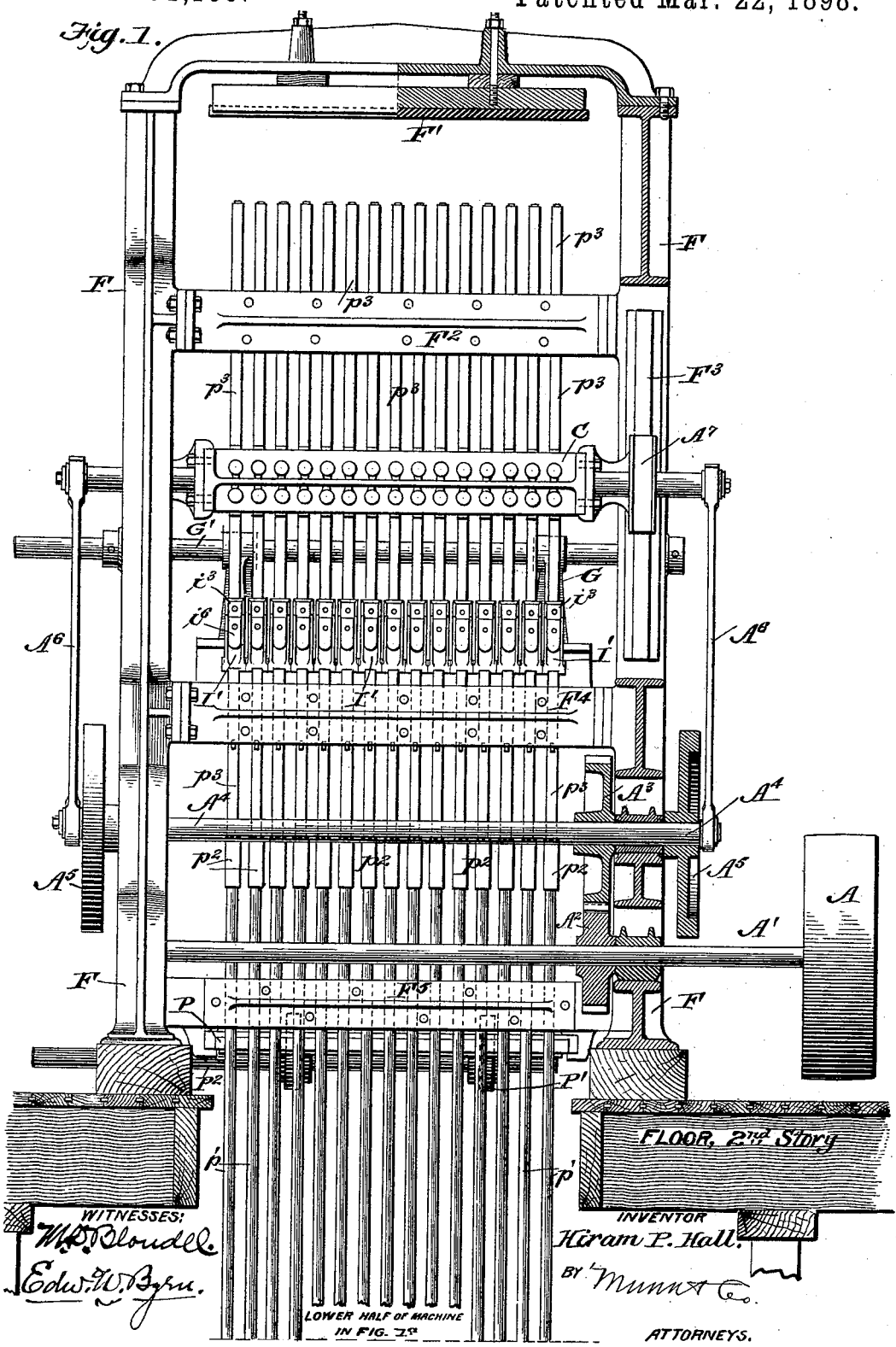

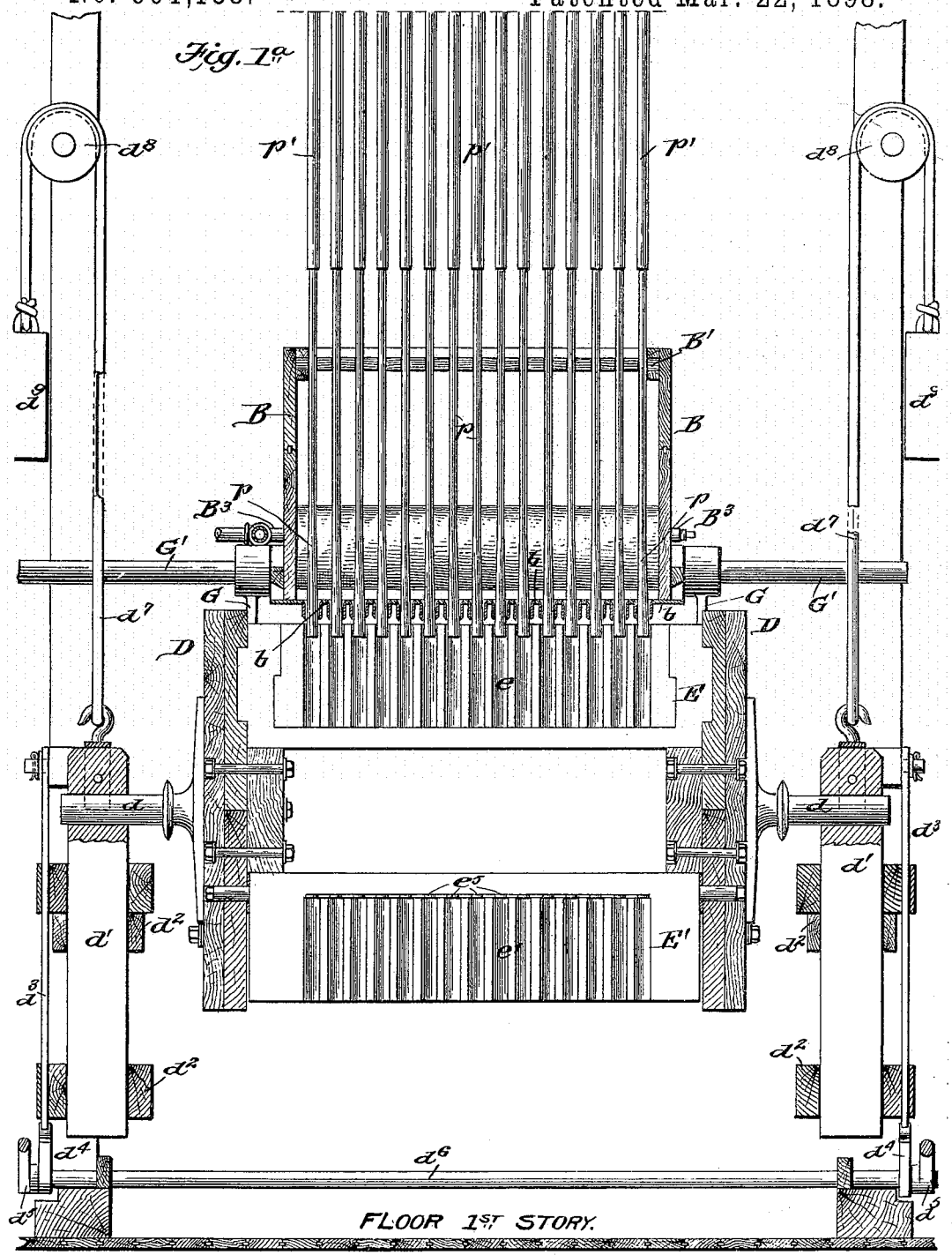

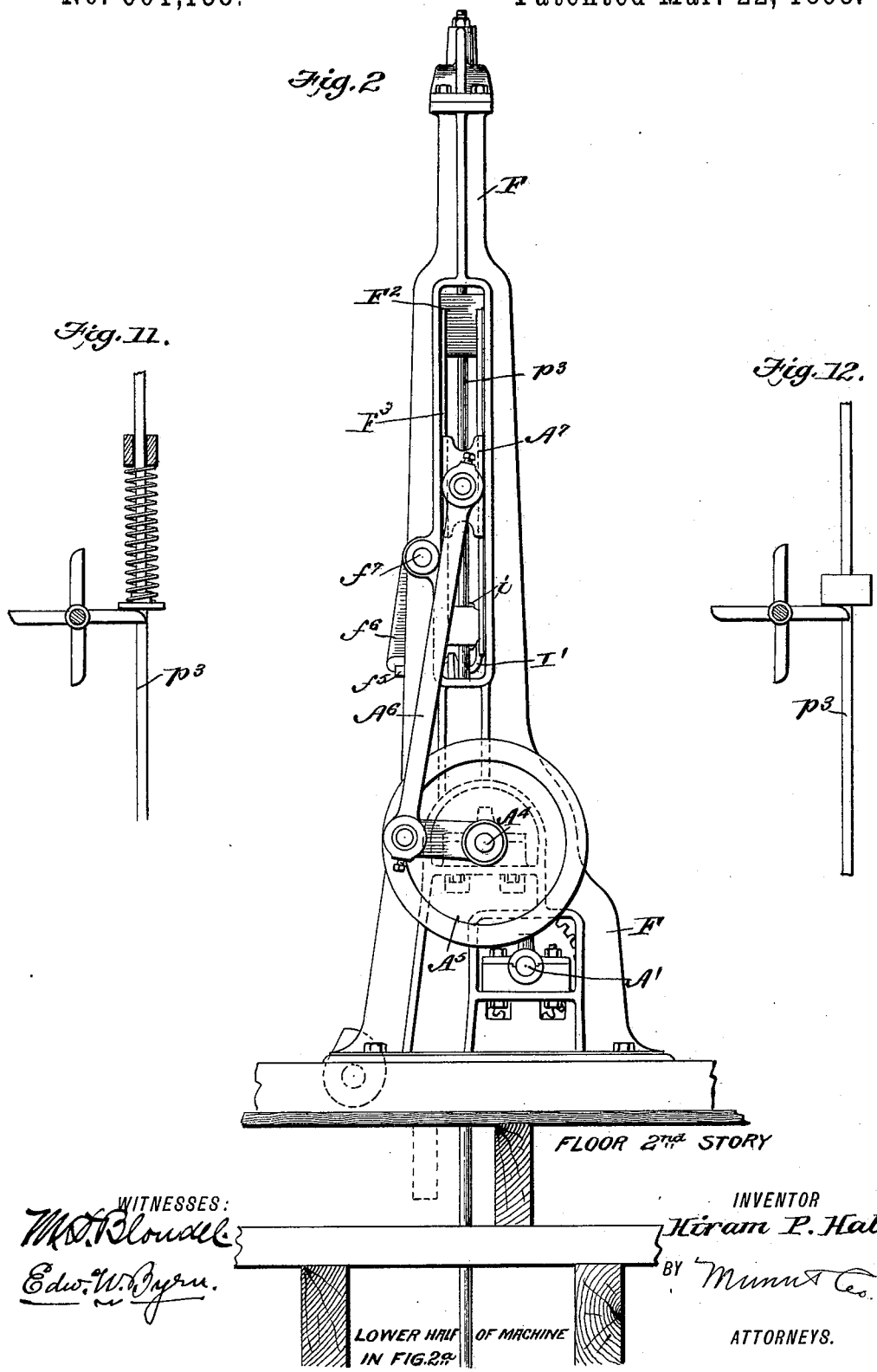

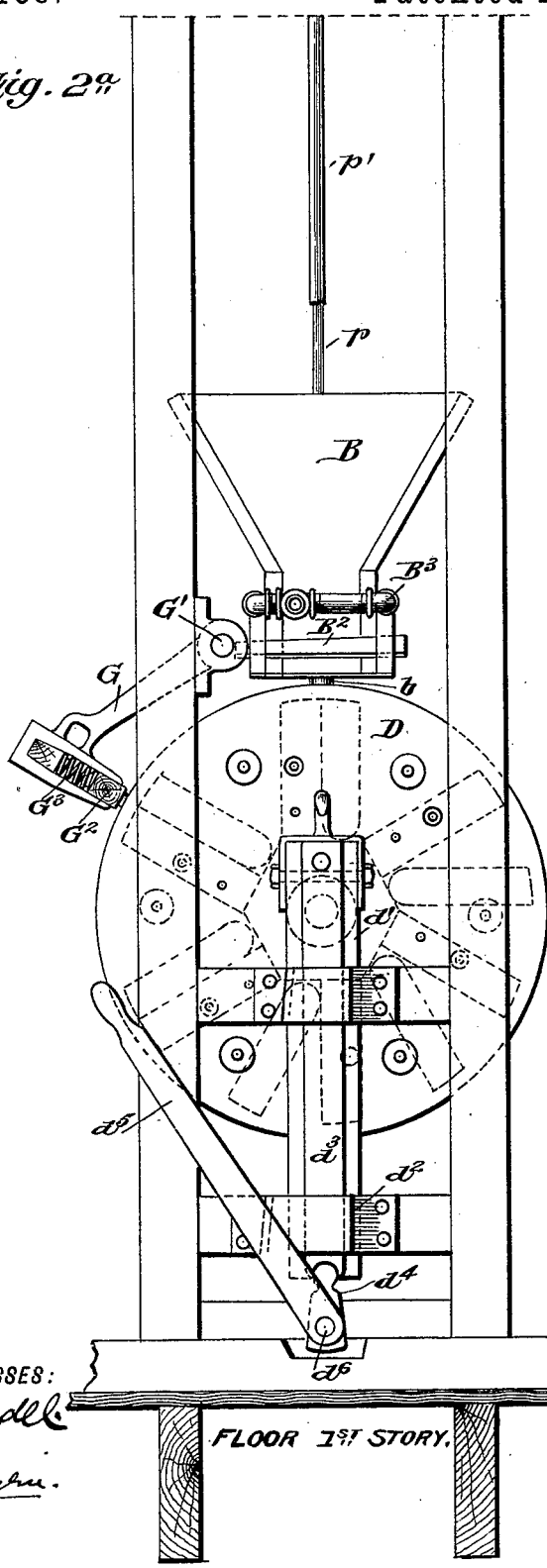

(No Model.) 7 Sheets—Sheet 5.

H. P. HALL.
CARTRIDGE LOADING MACHINE.

No. 601,138. Patented Mar. 22, 1898.

FLOOR 2ND STORY

LOWER HALF OF MACHINE IN FIG. 3.

WITNESSES:
M. S. Blondel
Edw. W. Byrn

INVENTOR
Hiram P. Hall.
BY Munn & Co.
ATTORNEYS.

THE NORRIS PETERS CO., PHOTO-LITHO., WASHINGTON, D. C.

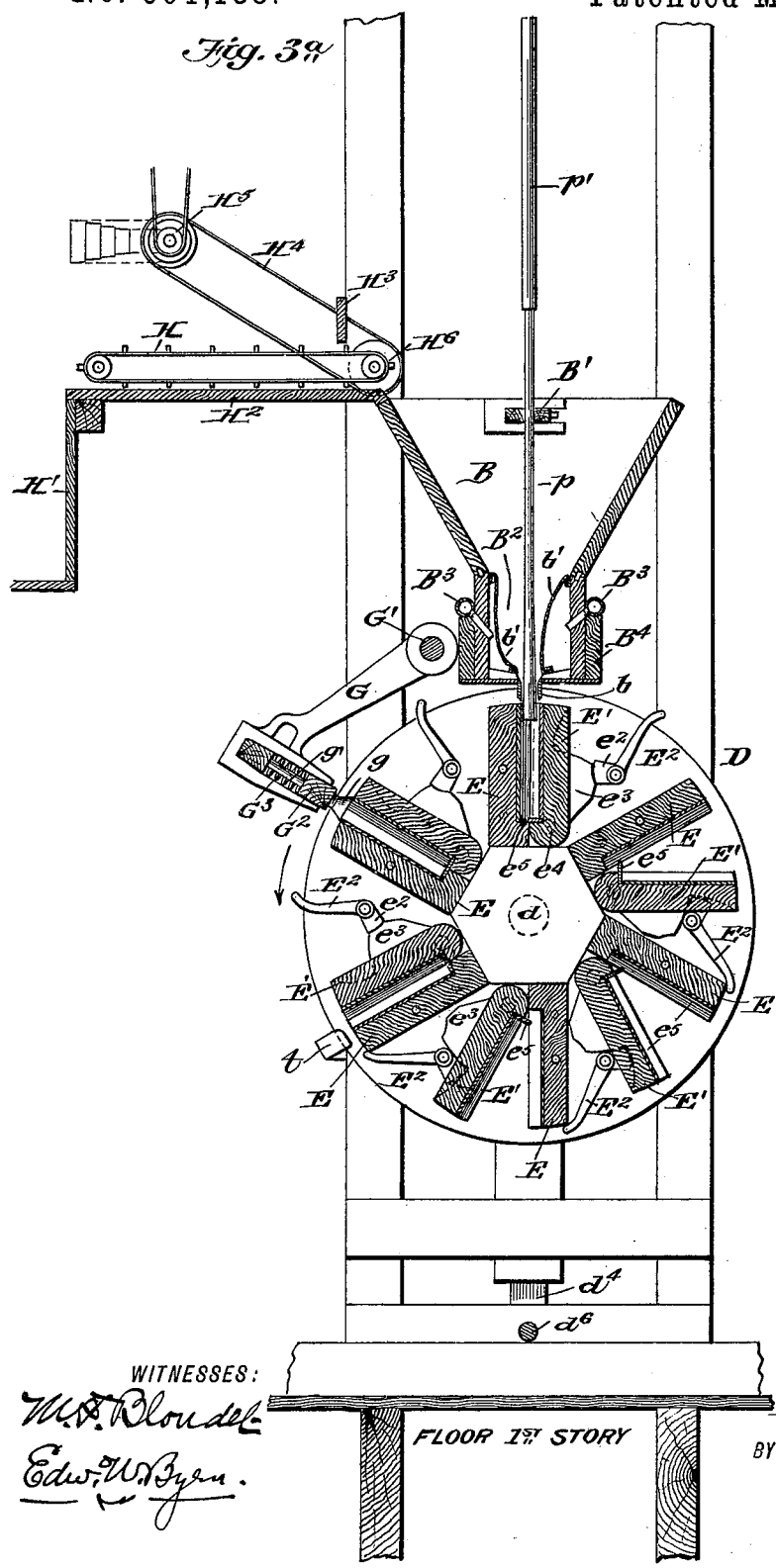

(No Model.) 7 Sheets—Sheet 7.
H. P. HALL.
CARTRIDGE LOADING MACHINE.
No. 601,138. Patented Mar. 22, 1898.
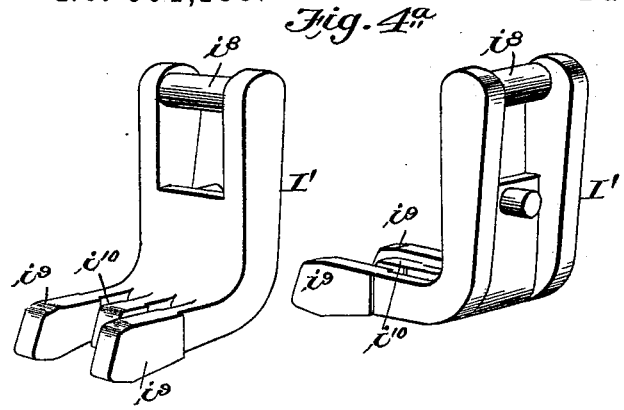
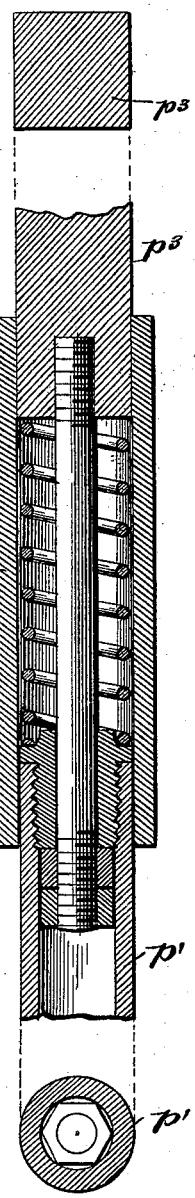
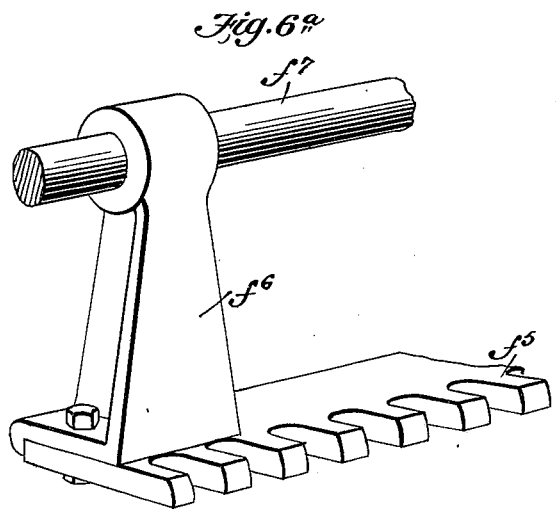
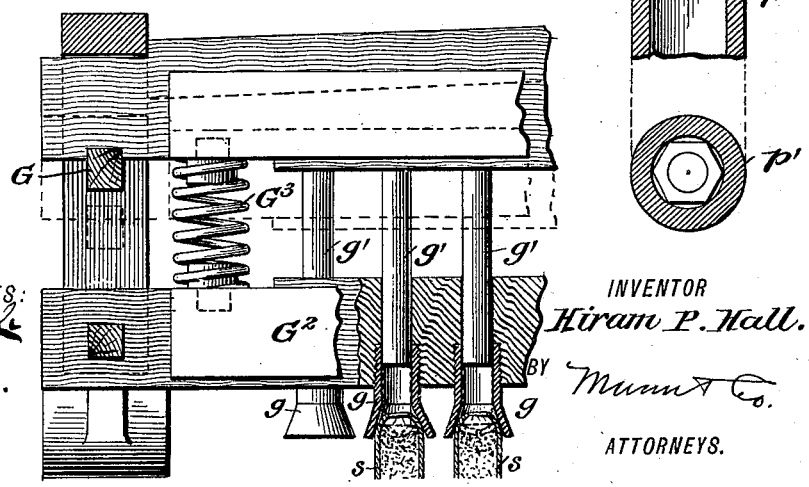
WITNESSES:
M. S. Blondel
Edw. W. Byrn
INVENTOR
Hiram P. Hall.
BY Munn & Co.
ATTORNEYS.

UNITED STATES PATENT OFFICE.

HIRAM P. HALL, OF WILMINGTON, DELAWARE, ASSIGNOR TO THE REPAUNO CHEMICAL COMPANY, OF SAME PLACE.

CARTRIDGE-LOADING MACHINE.

SPECIFICATION forming part of Letters Patent No. 601,138, dated March 22, 1898.

Application filed June 10, 1897. Serial No. 640,172. (No model.)

*To all whom it may concern:*

Be it known that I, HIRAM P. HALL, of Wilmington, in the county of New Castle and State of Delaware, have invented a new and useful Improvement in Machines for Loading Dynamite-Cartridges, of which the following is a specification.

The object of my invention is to provide a power-machine for filling and uniformly packing paper shells with an equal quantity of dynamite or other explosive, a large number at a time, and with perfect safety.

For the most part dynamite-cartridges are loaded by hand, and this involves the use of a large number of operatives and the necessary exposure of a large number of lives to the always-present dangers of explosion. My device provides a machine which takes the place of eighteen men and at the same time avoids this risk to a large number of workmen and cheapens the production of the cartridges.

Attempts have been made heretofore to load a number of cartridges at the same time by a series of rigidly-attached loading-plungers which pass through a hopper and force the dynamite through nipples and into the shells, which are held in a clamp-holder. This machine works slowly by hand and but imperfectly, for some of the shells would become filled before the others, and as all the loading-plungers were rigidly connected together it will be seen that some of the shells would be packed too hard with a dangerous degree of compression, while the others would be but imperfectly filled.

My invention provides means whereby every loading-plunger is rendered independent of every other one of the series, and when any one has filled its shell with the proper quantity and degree of density it is made to automatically stop, while the machine continues to work and the other plungers are completing the filling of their shells.

It also comprehends a special pneumatic stirrer for the dynamite by which dangerous friction is avoided, and also a feeding device whereby this sticky substance is evenly and continually fed to the shells as the machine is worked by power.

It also comprehends a special rotary shell-holder and means for crimping and closing the shells after being filled.

It also further consists in the special construction and arrangement of the various parts in details, which will be hereinafter more clearly described with reference to the drawings, in which—

Figure 7:
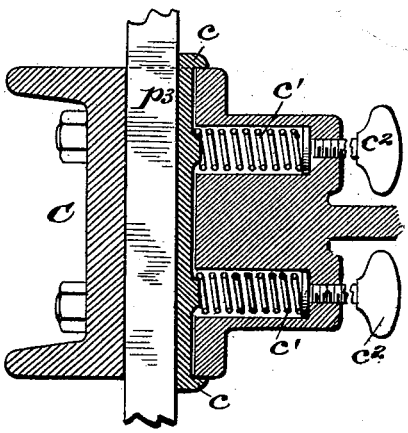
Figures 3, 4:
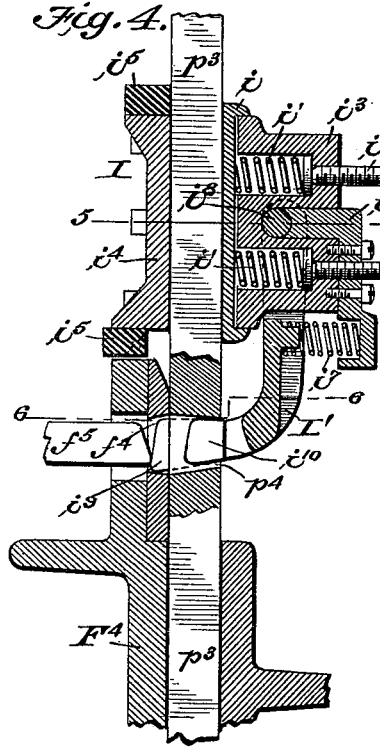
Figure 8:
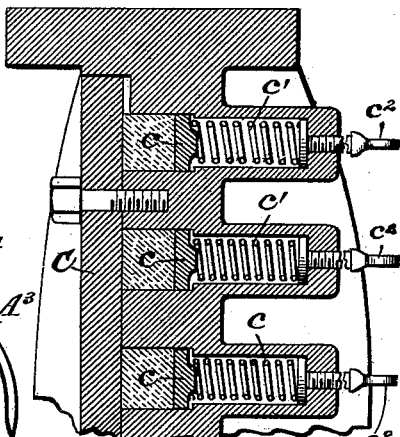
Figure 6:
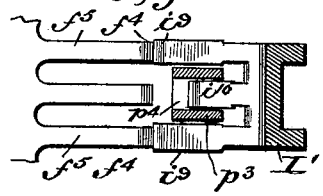

Figures 1 and $1^a$ represent on two sheets a front elevation of the machine, partly in section, Fig. 1 showing the upper half of the machine, which is supported upon an upper floor of the building, and Fig. $1^a$ showing the lower half of the machine, which is on the floor below and is connected through the ceiling with the part on the floor above. Fig. $1^b$ is an edge view of one of the shell-holders. Fig. 2 is a side elevation of the upper part of the machine, and Fig. $2^a$ a similar view of the lower portion of the machine. Fig. 3 is a vertical transverse section of the upper part of the machine, and Fig. $3^a$ a similar view of the lower part of the machine. Fig. 4 is a sectional detail, on a larger scale, of the plunger-locking devices. Fig. $4^a$ are details in perspective of the locking-dogs. Fig. 5 is a section of the same on line 5 5 of Fig. 4. Fig. 6 is a section on line 6 6 of Fig. 4. Fig. $6^a$ is a detail perspective of a part of the plunger-releasing device. Fig. 7 is an enlarged vertical section, and Fig. 8 an enlarged horizontal section through the cross-head that actuates the plungers. Fig. 9 is a detail in longitudinal section of the telescopic spring-section of the plunger. Fig. 10 is a sectional detail of the crimping and shell-closing device. Figs. 11 and 12 are details showing modified forms of devices for working the independent plungers.

Referring to Figs. 1 and $1^a$, the second-story part of the machine comprises (see Fig. 1) a metal framework F, in the lower portion of which is journaled a horizontal shaft $A'$, driven by a pulley A. On the shaft $A'$ is a rigid gear-wheel $A^2$, which meshes with another gear-wheel $A^3$ on a horizontal shaft $A^4$. On the opposite ends of the shaft $A^4$ there are disks $A^5$ $A^5$, with wrist-pins or cranks connecting with vertical pitmen $A^6$ $A^6$, which at their upper ends are fastened to the wrists of a cross-head C, having slides $A^7$, moving vertically in the guides $F^3$ of the upright frame.

This mechanism imparts an up-and-down reciprocation to the horizontal cross-head C, extending from side to side of the machine. The office of this cross-head is to reciprocate the series of vertical loading-plungers, which have a peculiar connection with the cross-head, as will be explained farther along. These plungers are made in several sections and extend from the top of the machine in the upper story down through the floor to the story below, and the operating devices for these plungers and all metal surfaces which rub together are kept in the upper story away from the lower floor where the loading of the dynamite is effected. The lower parts of these plungers (see Fig. 1$^a$) are made of wood, rubber, or other non-metallic material, as at $p$. The sections $p$ are screwed at their upper ends into metal tubes $p'$. These extend through the floor and have telescopic spring-sections $p^2$, Fig. 1, that connect with square metal sections $p^3$, that extend to the top of the machine. Cross-bars $F^2 F^4 F^5$, with vertical channels in them, serve to guide and space the plungers on the upper floor, and cross-bar B' in the dynamite-hopper B below guides their lower wooden ends. The extreme lower ends of these plungers (see Fig. 3$^a$) are made tapered and a little larger in cross-section at their lower ends, so that they permit air to escape around them in descending into the shells and also prevent an undue suction in rising out of the shells. The lower ends of these plungers play through nipples $b$ in the bottom of the dynamite-hopper and penetrate the paper shells to be loaded, which shells are held in a revolving holder D, rotating about a horizontal axis.

I will now describe in detail the several parts of the machine, beginning with the revolving shell-holder D at the bottom of the machine, as seen in Figs. 1$^a$ and 3$^a$. This shell-holder is composed of two wooden heads holding between them several horizontal series of shell-seats with the cavities in them arranged radially to the axis of the revolving holder. (See Fig. 3$^a$.) The heads are provided with trunnions $d$, Fig. 1$^a$, journaled in vertically-sliding bars $d'$, arranged in guides $d^2$ $d^2$ and sustained in a suspended condition by cords $d^7$, passing over pulleys $d^8$ and attached to balance-weights $d^9$. This construction permits the shell-holder both to revolve and to be raised and lowered bodily. The revolution about its axis is to permit each series of shells to be successively brought beneath the loading-plungers, while the up-and-down adjustment of the shell-holding drum is to permit the drum to be raised when brought under the plungers, so as to cause the empty shells in the shell-holder to be telescoped or slipped over the discharged nipples $b$ in the bottom of the hopper through which the plungers force out the dynamite. The drum is rotated by hand and is lifted (see Figs. 1$^a$ and 2$^a$) by levers $d^5$ $d^5$ on a rock-shaft $d^6$, which also has rigid arms $d^4$, that are jointed to the lower ends of swinging arms $d^3$ $d^3$, which at their upper ends are pivoted to the vertical slides $d'$, that sustain the drum. By rocking the shaft $d^6$ through the levers $d^5$ it will be seen that the arms $d^3$ $d^4$ act like toggle-arms to raise and lower the drum the required distance to connect and disconnect the shells and the discharge-nipples $b$.

The shell-holders are formed by a series of pairs of bars E and E', (see Figs. 3$^a$ and 1$^b$,) arranged between the heads of the drum, parallel to its axis. One of these bars, E, is fixed and the other, E', is hinged at $E^4$ about its inner edge, and they contain shell-seats $e$ and $e'$, Figs. 1$^a$, 1$^b$, and 3$^a$, which are strips of wood, each having a series of channels of semicylindrical shape arranged exactly opposite to each other, so that when the two sections E E' are closed or shut together they form cylindrical cavities to hold the paper shells, one of the shell-seats $e'$ being provided with disks $e^5$ at the bottom, upon which the shell rests. On the outside of the movable section E', near the ends, are formed abutments $e^3$, against which is adapted to bear a cam $e^2$, formed on the end of a lever $E^2$, which when turned outwardly, as shown at the top of Fig. 3$^a$, bears against the abutment $e^3$ and locks the shell-holder in its closed position, but when thrown to the position shown at the bottom of Fig. 3$^a$ allows the movable side of the shell-holder to open and the cartridges to drop out. To insert the empty shells in these holders, this is done by hand while the holders are open, as on the right of Fig. 3$^a$, and the movable side is then closed and locked by hand by turning up the levers $E^2$.

After the shell has been filled with dynamite the holder is lowered and revolved, and as the series of shells pass over to the left of Fig. 3$^a$ the projecting edges of the paper cartridges are crimped and closed as follows: G are arms on a rock-shaft G', which arms carry a slotted head, (see Figs. 3$^a$ and 10,) in which is seated a yielding bar $G^2$, having in it opposite each shell a tube terminating in a funnel $g$. Behind the bar $G^2$ and opposite each funnel-tube is a stationary plunger $g'$, and spiral springs $G^3$ bear against the yielding bar $G^2$. After the series of shells have been loaded and pass over into range of this crimper the arms G are brought down, the funnel $g$ of each tube receives the free edge of the shell (shown at $s$ in Fig. 10) and bends it inwardly, partially crimping it, and as the pressure increases the bar $G^2$ and funnel-tubes yield against the springs, and the plungers $g'$ strike the inturned edges of the shell and complete the crimp and securely and permanently close the shell upon its contents.

As the shell-holders pass around from the crimper in the direction of the arrow in Fig. 3$^a$ the levers $E^2$ strike a lug or stationary tappet $t$ on the framework and by deflecting the lever throws its cam $e^2$ off the abutment $e^3$ and unlocks and loosens the movable section E', allowing the filled shells to drop out.

I will now describe the operation of filling the shells with dynamite. The general method of forcing plungers through a hopper containing dynamite and driving the latter out through nipples into the shells is not new, as before stated; but dynamite being a moist and semiplastic substance like brown sugar it does not feed freely and uniformly, and yet this is necessary to the proper loading of the shells. At the same time a method of stirring or agitating the explosive must be provided which is free from danger. For this purpose (see Fig. 3$^a$) the lower part of the hopper B is formed as a rectangular box B$^2$, and on each inner wall of the same is an inflatable bag or apron $b'$ and $b'$, forming an inclosure with the side of the box B$^2$. With these two inflatable bags there communicates an air-pipe B$^3$. From these pipes air is alternately introduced into and exhausted from the bags, and when the bag on one side of the discharge-openings in the bottom of the box is inflated the bag on the other side is collapsed. The effect of this is to alternately push the dynamite first from one side and then from the other over the discharge-holes and beneath the plungers with the most positive action, and yet with the least danger from friction. Instead of using these bags I may leave them off entirely and simply discharge air from the pipes through nozzles, as shown, full into the dynamite to stir it. This gives the same moving effect without friction and also keeps the dynamite cool.

For feeding the dynamite to the hopper B in a uniform manner and in a quantity exactly equal to that discharged by the plungers an endless slatted apron H travels over a table-surface H$^2$ between the hopper B and the stock-box H$'$, and from this stock-box the dynamite is placed by shovels onto the apron H, and as it passes to the hopper B it moves under a scraper-bar H$^3$, which rakes off the dynamite to a uniform thickness before being delivered into the hopper. This apron is run by a belt H$^4$ and cone-pulleys H$^5$ H$^6$, by which latter the speed of the apron and the amount of dynamite fed is regulated to suit the size of cartridges being made. To vary the size of cartridges, different sizes of plungers $p$ are used, and the bottom of the hopper-box is made of a removable portion B$^4$, carrying a sheet-metal bottom with nipples $b$, so as to permit different sizes of nipples to be used.

I will now proceed to describe one of the most important features of my invention, and that is the means for the independent operation of the plungers and means for locking any one of them stationary, as soon as it shall have filled its shell, without stopping the action of the others.

Referring to Figs. 1 and 3, it will be remembered that each plunger, as composed of sections $p$ $p'$ $p^2$ $p^3$, slides vertically in the cross-bar guides F$^2$ F$^4$ F$^5$ of the main frame and is reciprocated vertically therein by the cross-head C. This cross-head (see Figs. 7 and 8) has a series of independent square channels for the reception of the squared upper ends of the plungers, and each channel has on one side a friction clamp-plate $c$, held into engagement with the plungers by springs $c'$, whose tension is so regulated by set-screws $c^2$ as to give any desired degree of frictional contact. This frictional connection of the plungers with the cross-head causes the latter to reciprocate the plungers, but still leaves them independent thereof, so as to slide through it when the conditions necessitate the same.

Just below the cross-head C and above the guide-bar F$^4$ there is a series of dogging devices I, whose function is to lock any one of the plungers as soon as it shall have filled its shell and risen to a point where its action is no longer needed. These dogging devices are shown in detail in Figs. 4, 5, and 6. A detachable plate $i^4$ and frame-plate $i^3$ form a square socket for the plunger-section $p^3$ and contain a friction-plate $i$, that is forced against the plunger by springs $i'$, housed within recesses in frame-plate $i^3$ and adjusted as to tension by set-screws $i^2$. This dog-socket moves with the plungers and yet allows the plungers to rise through the same as they gradually recede upward and finally lock the plungers stationary, as follows: To each socket a dog I$'$ is hung (see Fig. 4) about its axial bar I$^8$, which is seated in a journal-bearing in the frame-plate $i^3$ and there retained by the removable plate $i^6$. Between this plate $i^6$ and the dog is interposed a spring $i^7$, which forces the lower end of the dog inwardly toward the plunger. The lower end of each dog (see Figs. 4, 4$^a$, and 6) has three teeth—a short middle tooth $i^{10}$ and two longer outer teeth $i^9$ $i^9$. The short middle tooth $i^{10}$ is designed (see Figs. 4 and 6) to penetrate a slot or notch $p^4$ in the plunger $p^3$, and the outer ones, $i^9$, are designed to straddle the plunger and penetrate the notches $f^4$ in a stationary plate on the cross-bar F$^4$. When the dog I$'$ is thus positively locked to both the plunger and the stationary framework, the said plunger cannot move in response to the reciprocation of the cross-head. To unlock the dog from the framework, a series of discharging-bars $f^5$ (see Figs. 3, 6, and 6$^a$) are formed on a plate like the teeth of a comb and are arranged immediately opposite the recesses $f^4$, in which the teeth $i^9$ of the dog are locked. The discharging-bars are sustained upon radial arms $f$ from a rock-shaft $f^7$, and when this is rocked by hand and the bars $f^5$ forced inwardly the dogs are all unlocked and the plungers are free to move again.

Now when the shells of the cartridges are packed with dynamite it will be seen that if all the plungers are connected rigidly together any one of them is liable to be filled in advance of the others, and if its plunger continued to act the dynamite would be compressed too hard in that shell, while the others would be but imperfectly filled; but by my construction, in which the plungers are each independent in its action, whenever a plunger which has filled its shell in advance of the others rises to a given point the slot $p^4$ (see Fig. 4) rises into range of registration with the middle tooth of the dog, and this drops into said slot, and following this the outer teeth $i^9$ enter the recesses $f^4$ in the stationary plate or cross-bar $F^4$, and thus this plunger is locked stationary, while all the others continue to work until they have filled their shells, when the same action takes place with them. When the shells are being packed with dynamite by successive reciprocation of the plungers, every movement of each plunger carries a definite quantity of dynamite into the shell and each plunger must as the shell becomes filled rise with its frictionally-attached dogging device; but when the cross-head comes down the next time it strikes against the rubber cushion $i^5$ of the dogging device and its frictional plate $i$ permits it to be driven down by the cross-head on the plunger just as far as it had heretofore risen from the growing bulk of the dynamite in the shell; but it will be seen that the positive lock of the outer teeth $i^9$ cannot occur until the plunger has reached its extreme height from a perfectly-filled shell, at which time only the slot $p^4$ in the plunger comes into range of engagement with the middle tooth of the dog and allows the positive lock to occur.

When the shells are being packed, the plungers have a slight yielding motion in the direction of their length to prevent too positive impact. This is effected by a telescopic spring-section $p^2$, which is best shown in detail in Fig. 9. When, however, the series of shells are filled and the shell-holder is withdrawn from the nipples below the hopper, this spring-section of the plunger would cause the latter to throw out of the nipples the amount of dynamite that they hold if the plungers were not restrained. To do this, I at this time pinch and hold all of the plungers by a cushioned bar P, (see Fig. 3,) which is forced up and held against the plungers by cams P' on a shaft $P^2$.

When the plungers are raised by the cross-head, they do not all stand, necessarily, on the same level, owing to the different quantities of dynamite in the different shells. They are brought to the same level, however, before starting on the downstroke by a cushioned abutment-plate F', Fig. 1, against which the plungers strike and by which they are leveled. This causes all of the independent plungers to have an equal advance stroke through the dynamite.

As a modification of my invention I may, in carrying out my invention of the independently-acting plungers, arrange them to descend from gravity-weights, as seen in Fig. 12, or by spiral springs, as in Fig. 11, being lifted by a shaft with tappet-arms instead of being actuated on both the up and down stroke by a reciprocating cross-head with sliding friction-clamps, as heretofore described.

I would state, furthermore, that I do not confine my invention to loading dynamite-cartridges, but may employ it for loading all sorts of explosive substances into cases—as, for instance, in the manufacture of fireworks.

Having thus described my invention, what I claim as new, and desire to secure by Letters Patent, is—

1. In a machine for loading shells with a granular or comminuted material, a series of independent plungers, means for reciprocating them together, and an automatic locking mechanism for each plunger to hold it out of action when its shell has been filled substantially as and for the purpose described.

2. A machine for uniformly filling shells with granular or comminuted materials, consisting of the combination with a shell-holder, and a hopper, of a series of reciprocating loading-plungers, and actuating mechanism for the plungers, each plunger having an independent clutch mechanism whereby it is disconnected from its actuating mechanism and held inactive when it has completed the filling of the shell, while the other plungers continue at work substantially, as and for the purpose described.

3. In a machine for filling shells with granular or comminuted material, the combination with the series of parallel and independent loading-plungers, of an actuating device for reciprocating them all together, said actuating device being connected to the plungers by friction-clamps corresponding in number to the plungers whereby a progressive backward feed of the plungers at a differential rate is allowed as the shell becomes filled and the plungers penetrate less and less into the same substantially as described.

4. In a machine for filling shells with granular or comminuted material, the combination with the independent loading-plungers, of an actuating device with independent friction-clamps for reciprocating them, and independent locking devices for locking any one of the plungers against reciprocation when it has filled its shell substantially as and for the purpose described.

5. In a machine for filling shells with granular or comminuted material, the combination of independent loading-plungers having springs interposed in their length, a reciprocating device having independent friction-clamps for connecting the same with the plungers, and independent locking devices for each plunger for locking each one of them when it recedes to a certain position as and for the purpose described.

6. In a machine for filling shells with granular or comminuted material, the combination with a series of independent plungers, of a reciprocating cross-head for actuating the plungers, said cross-head having channels through it for the plungers to work through, a single detachable plate on one side closing in all the said channels, and a friction-plate with springs, and adjusting-screws, one set for each channel, and on the opposite side of each channel from the single detachable plate substantially as and for the purpose described.

7. In a machine for filling shells with granular or comminuted material, the combination of a series of independent plungers having locking-notches in them, a reciprocating cross-head with a sliding friction-clamp for working the plungers, a series of locking-dogs, one for each plunger having one tooth to engage the plunger and the other to engage a stationary part of the framework, and an ejecting or dislodging device for each dog substantially as and for the purpose described.

8. A pneumatic stirring device for agitating, and promoting the feed of granular or comminuted material, comprising two inflatable bags or aprons arranged upon opposite sides of the delivery-outlets, and means for introducing air alternately into the opposite bags or aprons substantially as and for the purpose described.

9. In a machine for filling shells with granular or comminuted material, the combination of a series of independent plungers, means for reciprocating them, and a stop bar or abutment arranged across the plungers to level them all on the back stroke for an equal advance movement through the material substantially as described.

10. The dogging device for the plungers, consisting of a socket-plate with friction-plate $i$ and adjustable springs, the pivoted and spring-pressed dog I' with a middle tooth $i^{10}$, and one or more side teeth $i^9$, in combination with the plungers having a locking recess to receive the tooth $i^{10}$, a stationary plate to receive the side teeth $i^9$, and a series of ejecting-fingers $f^5$ arranged to throw out the teeth $i^9$ substantially as and for the purpose described.

11. The combination with the plungers, of a locking device comprising plate $i^4$, frame-plate $i^3$ with friction-plate $i$, springs $i'$ and set-screws $i^2$, the dog I' with axis $i^8$, and three teeth $i^9$, $i^{10}$, $i^9$, the spring $i^7$, and the retaining-plate $i^6$ for the dog and its spring substantially as shown and described.

12. The combination with the independent plungers having each a spring acting in the direction of its length, and a hopper having nipples through which the plungers act, of a special retaining device for acting simultaneously upon all the plungers to prevent their lower sections from pushing the material out of the nipples from the action of their springs, when the resistance of the shell-holders is removed substantially as described.

13. The combination with the independent plungers having each a spring acting in the direction of its length, and the hopper with its nipples, of the pinch-bar P for the plungers, the cam P', and shaft P² substantially as and for the purpose described.

14. A shell-holder for a loading-machine consisting of a revolving drum with a series of two-part shell-cells arranged longitudinally and radially, one part being stationary, and the other hinged substantially as and for the purpose described.

15. A shell-holder for a loading-machine, consisting of a revolving drum with a series of two-part shell-cells arranged longitudinally and radially, one part being stationary, and the other being hinged at its inner edge and provided with locking-abutment $e^3$, and the locking-levers E² with cams $e^2$ substantially as and for the purpose described.

16. In a shell-loading machine, the combination with the hopper and its pendent nipples, of a revolving shell-holder arranged about a horizontal axis, and vertically-adjustable bearings for said axis for raising the shell-holder bodily to telescope the shells onto the nipples or to remove them substantially as and for the purpose described.

17. The combination with the revolving shell-holder having trunnions $d$, of the counterbalanced slide-bars $d'$ carrying said trunnions, the hinged bars $d^3$, and the shaft $d^6$ with lever $d^5$ and arms $d^4$ acting upon bars $d^3$ as a toggle substantially as and for the purpose described.

18. The combination of the revolving shell-holder having separable shell-cells E E' with abutments $e^3$, the locking-levers E² with cams $e^2$, and the main frame having tappet or lug $t$ adapted to trip and open the locking-levers substantially as and for the purpose described.

19. The combination with the revolving shell-holder, of a crimping device consisting of rock-shaft G' with arms G bearing a head, said head consisting of yielding bar G² with funnel-shaped tubes $g$, stationary plungers $g'$, and springs G³, substantially as and for the purpose described.

20. The combination with the hopper, of the horizontal endless belt H having transverse slats on it, the scraper-bar H³, the subjacent table H² extending from the stock-box to the hopper, and a speed-adjusting drive belt and pulleys substantially as and for the purpose described.

HIRAM P. HALL.

Witnesses:
 H. G. HASKELL,
 CHARLES H. SASSE.